United States Patent [19]

Martineu et al.

[11] Patent Number: 4,977,192

[45] Date of Patent: Dec. 11, 1990

[54] POLYMER COMPOSITION CHARGED WITH POWDERED MINERAL MATERIAL WITH A HIGH CAPACITY OF WATER ABSORPTION

[75] Inventors: Pierre Martineu, Bron; Christiane Saunier, Venissieux; Jacky Rousset, Chaillon-sur-Chalaronne; Christian Jacquemet, Ecully, all of France

[73] Assignee: Coatex S.A. & Conservatome S.A., Caluire, France

[21] Appl. No.: 187,462

[22] Filed: Apr. 28, 1988

[30] Foreign Application Priority Data

Apr. 28, 1987 [FR] France ................................. 87 06217

[51] Int. Cl.$^5$ ...................... C08J 9/16; C08F 220/06; C08F 8/42; C08C 19/22
[52] U.S. Cl. ........................................ 521/56; 521/149; 522/167; 523/205; 523/209; 524/442; 525/369
[58] Field of Search .......................... 424/78; 522/167; 523/205, 209; 524/442; 525/369; 521/56, 149

[56] References Cited

U.S. PATENT DOCUMENTS

| | | | |
|---|---|---|---|
| 3,963,512 | 6/1976 | Swift et al. | 523/209 |
| 4,206,094 | 6/1980 | Yen et al. | 523/205 |
| 4,418,163 | 11/1983 | Murakami et al. | 523/209 |
| 4,555,319 | 11/1985 | Cohen et al. | 522/167 |

Primary Examiner—Merrell C. Cashion, Jr.
Assistant Examiner—C. Azpuru
Attorney, Agent, or Firm—Oblon, Spivak, McClelland, Maier & Neustadt

[57] ABSTRACT

A granular polymer composition having increased water absorption and desorption capability, resistance to photogradation and increased life span, comprising a water-insoluble but swellable cross-linked polymer material formed of at least one polymer and/or copolymer prepared from at least one unsaturated ethylene monomer having at least one carboxylic, amide, sulfuric, sulfonic, phosphoric, phosphonic, or hydroxyl functional group and at least one powdered mineral charge well dispersed in and intimately bonded to said polymer as a result of its introduction into the mixture of monomers of the same type or of a different type before their polymerization into said polymer or copolymer.

24 Claims, No Drawings

POLYMER COMPOSITION CHARGED WITH POWDERED MINERAL MATERIAL WITH A HIGH CAPACITY OF WATER ABSORPTION

BACKGROUND OF THE INVENTION

1. Field of the Invention

The invention relates to a polymer composition charged with a powdered mineral material which is in an insoluble granular form but which is inflatable in water, composed of at least one crosslinked polymer prepared from at least one unsaturated ethylene monomer having at least one carboxylic, amide, sulfuric, sulfonic, phosphoric, phosphonic or hydroxyl functional group and at least one inert, powdered mineral charge which is well dispersed within and intimately bonded to the polymer material, and to a method for obtaining said charged granular composition.

b 2. Discussion of the Background

For some time, the specialized literature has published numerous formulations of particulate polymer materials containing inert mineral charges as well as the methods enabling the production of these compositions.

These particulate polymer materials, which are in the form of gelatinous granules or which have a certain elasticity, have, in a well-known manner, the property of absorbing several times their weight of water when they are placed in contact with an aqueous medium through immersion or aspersion for example, and of slowly releasing the absorbed water when the saturated granules are incorporated in a plant growth medium. In this manner, the absorption of a large quantity of water by these particulate polymer materials (incorporated in a plant growth medium) during rainfall or artificial watering, enables slow release of the accumulated water into the surrounding medium and, consequently, the creation of an almost permanent damp medium which is suitable for plant development.

In addition, through this mechanical expansion-contraction effect, the water absorption and desorption cycles of the particulate polymer materials, which cause variations in their apparent volume, promote the aeration of the plant growth media in which they are incorporated because of voids created by the expansion-contraction cycle.

Finally, the particulate polymer materials having a high water absorption and desorption capability have also been described as useful in agricultural preparations which include fertilizers and/or biocidal agents.

Such particulate polymer materials combined with inert mineral charges are described in French Pat. No. 2,173,934 and are obtained by a method which consists of combining a mixture of at least one powdered hydrophilic and water-soluble polymer and an inert powdered charge with a view to covering the contact surface of said polymer, then of submitting said mixture, in the presence of a certain quantity of water, to the action of ionizing radiation in order to cross-link the polymer.

In spite of all the advantages of the products produced by this method, the particulate polymer materials associated with inert mineral charges always demonstrate certain disadvantages which can be considered as being major.

A first major disadvantage resides, for example, in the fact that these particulate polymer materials are formed from a quantity of at least one particulate polymer, which comprises the core or nucleus of each particle of the product and of a layer of powdered inert mineral material which is coated on and adheres to the particulate polymer material base. The mineral layer forms a protective screen against the natural photo-destruction of ultraviolet radiation.

However, the layer of powdered mineral material which adheres to the particles of the particulate polymer material can be naturally discontinuous, leaving open areas of polymer material not covered by mineral material which areas of polymer material are exposed to the action of destructive photons. In addition, the cycles of expansion and contraction which the particulate polymer materials experience, can cause disintegration of the inert mineral matter adhering more or less strongly to the polymer material, and these cycles break the protective mineral layers of the particulate polymer material, rendering it particularly sensitive to photodegradation by ultraviolet radiation.

Further, and as the phenomenon has been observed, during the water absorption and desorption cycles, the particulate polymer materials lose part of their capability to take in water and this capability decreases more rapidly because the particulate polymer material, losing its protective screen, is sensitive to photodegradation, thus causing premature disappearance through destruction of the particulate polymer materials used in plant growth media.

Other particulate polymer materials associated with inert mineral charges are also described by their compositions and by the methods of preparing the same in Patent EP 0,072,213. Such particulate compositions which are useful as an additive for plant growth media comprise gel particles which consist of an acrylamide copolymer and a (meth)acrylic acid salt, in which the molar ratio is at least 70:30 but not greater than 95:5, and are chemically cross-linked so that the amount of water-soluble polymer is less than 30% by weight of the dry polymer, with the external surface of said gel particles being modified by means of a finely particulate hydrophilic agent such as kaolin, fuller's earth, talc, bentonite and aluminum silicate. However, these chemically cross-linked particulate polymer materials having mineral coating charges exhibit the same major disadvantages as those noted in the above-discussed reference. A need therefore continues to exist for a mineral containing polymer product of improved stability properties.

SUMMARY OF THE INVENTION

Accordingly, one object of the present invention is to provide a cross-linked polymer composition charged with powdered mineral material in granular form having the desired properties of a very high water absorption and desorption capability, a substantial resistance to photodegradation and a substantially improved life span together.

Briefly, these objects and other objects of the present invention as hereinafter will become more readily apparent can be attained by a granular polymer composition having increased water absorption and desorption capability, resistance to photogradation and increased life span, comprising a water-insoluble but swellable cross-linked polymer material formed of at least one polymer and/or copolymer prepared from at least one unsaturated ethylene monomer having at least one carboxylic, amide, sulfuric, sulfonic, phosphoric, phosphonic, or hydroxyl functional group, and at least one powdered mineral charge well dispersed in and intimately bonded to said polymer as a result of its introduction into the mixture of monomers of the same type or of a different type before their polymerization into said polymer or copolymer.

Another object of the present invention is to provide a method of preparing a polymer composition which is charged with a granulated mineral material.

DETAILED DESCRIPTION OF THE PREFERRED EMBODIMENTS

Whereas the prior art describes water-retaining particulate compositions formed from a polymer material nucleus which is coated with a layer of powdered mineral material, the composition of the present invention is distinguished by the fact that the polymer material is formed from at least one polymer and/or copolymer obtained from specific monomers and that this polymer material is not coated with the mineral material but contains it within as a homogeneous dispersion.

The polymer, copolymer or combination thereof of the present invention is prepared by the polymerization of at least one of the monomers described above, said polymer or copolymer having the formula:

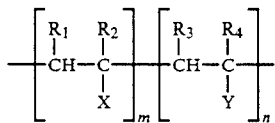

wherein X and Y are each different or identical and are selected from the group of —COOH, —CONH$_2$, —O—SO$_3$H, —SO$_3$H, —O—PO$_3$H$_2$, —PO$_3$H$_2$, or —OH functional groups, and m and n, expressed in percent by weight, are selected within the ranges $0 \leq m \leq 100$ and $100 \leq n \leq 0$.

More particularly, the radicals $R_1$ and $R_3$ can be selected from the group consisting of —H, —OH, —COOH and the substituted or unsubstituted alkyls, while the radicals $R_2$ and $R_4$ can be selected from the group consisting of —H, —COOH, —CO—NH$_2$, —O—SO$_3$H, —SO$_2$H, —O—PO$_3$H$_2$, —PO$_3$H$_2$, —OH and the substituted or unsubstituted alkyls. When the radicals $R_1$, $R_2$, $R_3$ and $R_4$ are substituted or unsubstituted alkyls, the radicals preferably contain from 1 to 4 carbon atoms.

Suitable ethylenically unsaturated monomers include acrylic, methacrylic, itaconic, crotonic, isocrotonic, aconitic, fumaric, mesaconic, sinapic, undecylenic, angelic, hydroxyacrylic and maleic acids and anhydrides; acrylamide, methacrylamide, acrylamidopropane sulfonic acid, vinyl ether, vinyl sulfonic acid, vinyl alcohol, styrene sulfonic acid, alkyl acrylates and methacrylates, hydroxyalkyl acrylates and methacrylates, phosphoric acrylate and hydroxymethacrylate esters such as ethylene glycol methacrylate phosphate, sulfuric acrylate esters and hydroxymethacrylate.

The above-identified acids can be in the acid form or as a salt of a monovalent metal such as sodium or potassium, or ammonium ion, or of a divalent metal such as calcium, magnesium or the like.

The mineral charge intimately dispersed within said polymer and/or copolymer is generally selected from among the clay minerals which are capable of forming a plastic suspension which is stable on contact with water. Suitable minerals include the kaolinites such as kaolinite, dickite, halloysite, disordered kaolinites and serpentines; the micas such as muscovite, biotite and paragonite, pyrophyllite and talc; the illites and glauconite; the montmorillonites such as bentonite, beidelite, stevensite, saponite and hectorite; the chlorites; the vermiculites; the interstratified clays whose unitary structure is a combination of the preceding groups; the fibrous clays such as attapulgite (polygorskite) and sepiolite.

The clay minerals also include other minerals such as quartz, calcite, dolomite, gypsum, limonite (FeO(OH)n-H$_2$O) and other metallic oxides and hydroxides.

The mineral charge which is intimately dispersed within the polymer and/or copolymer is present in the polymer composition in a weight ratio of mineral charge to monomer mixture (expressed dry) which ranges from 10/90 to 90/10, preferably 50/50 to 20/80.

The polymer composition charged with powdered mineral material can also contain, in addition to the mineral charge, other known agents such as agents which promotes chemical cross-linking, agents which stabilize against ultraviolet radiation, dispersing agents, coloring agents, pigments, biocidal agents such as herbicides, fungicides, nematicides and insecticides, agents for soil conditioning and improvement such as fertilizers, and the like.

The polymer composition charged with powdered mineral material intimately dispersed therein is cross-linked by any convenient method known to those of skill in the art, such as for example, chemical cross-linking, cross-linking using ionizing radiation which ensures the removal of residual monomer after polymerization and the possible formation of free radicals on the dispersed mineral material whose presence can promote the creation of internal bonds.

In another embodiment of the invention a method is provided for the preparation of a granulated polymer composition charged with powdered mineral material, having both a high water absorption and desorption capability, a substantial resistance to photodegradation and a considerable life-span.

In the first step of the present method, an aqueous phase mixture is prepared by stirring a finely divided powdered mineral charge in at least one unsaturated ethylene monomer having at least one X or Y functional group, thereby preparing a dispersion of the mineral material in the monomer.

A chemical cross-linking agent and/or other known agents are then optionally introduced into the suspension, and then the polymerization and/or copolymerization is carried out in the presence of known initiators and regulators for the above-identified monomers or polymerization is initiated by ionizing radiation. In the event no cross-linking agent is added the polymerized mass obtained is subjected to ionizing radiation either before or after granulation to form the product desired.

If the reaction medium contains a sufficient amount of cross-linking agent to give a fully cross-linked product, subsequent to the polymerization step in which cross-linking also occurs, the polymerized mass is granulated to obtain the product.

In the event insufficient cross-linking agent has been added to the aqueous monomer phase mixture, upon completion of the polymerization step, the mass obtained is subjected to ionizing radiation for a time to complete cross-linking of the polymer material and then the cross-linked mass is granulated. Alternatively, the polymerized mass obtained may be first granulated and then cross-linking completed by exposure of the granulated material to ionizing radiation for a sufficient time.

When the polymerization and/or copolymerization is carried out by chemical means, it is done using known radical polymerization methods, preferably in an aqueous medium and possibly in an aqueous alcohol medium of the above-identified ethylene monomers, in the presence of polymerization and/or copolymerization initiators such as peroxides and per salts, for example, hydrogen peroxide and persulfates and in the presence of polymerization regulators such as, for example, organic compounds such as hydroxylamines and mercaptans.

When the polymerization and/or copolymerzation is carried out by radiochemical means, it is done using known radical polymerization methods by means of an ionizing radiation source such as, for example, radioactive isotopes. The phrase "ionizing radiation", within the framework of the invention, means that the radiation carried out has sufficient energy to cause single electron excitation and/or ionization of the polymer and/or copolymer molecules.

In addition, it is possible to introduce into the suspension of monomer and mineral material a chemical cross-linking agent selected from among the known cross-linking agents such as, for example, methylene-bis-acrylamide, tetraallyl oxyethane and methylol acrylamide. The weight ratio of the mixture of unsaturated ethylene monomers and the aqueous or aqueous alcohol phase of the first step can vary between 80/20 and 20/80, preferably between 60/40 and 40/60.

The polymerization and/or copolymerization medium is generally water, but it can be a mixture of water and a water-miscible polar solvent such as, for example, methanol, ethanol, propanol, isopropanol, butanols or even acetone, methylethylketone, or the like.

The polymer composition charged with powdered mineral material intimately dispersed within the mass of polymer and/or copolymer is submitted to ionizing radiation for the purpose of conducting or completing cross-linking of the polymer and to make the polymer and/or copolymer insoluble in water and to confer upon said composition in accordance with the invention the desired characteristics.

The polymer material comprising mineral material is subjected to ionizing radiation either before or after it is granulated by known means if it has not previously been subjected to cross-linking or partial cross-linking.

The sources of suitable ionizing radiation include radioactive isotopes which emit gamma rays such as, for example, $Co^{60}$ and $Cs^{137}$, X-ray generators, and electron accelerators which generate beta rays.

The ionizing radiation used in the process of the present invention should desirably have an energy level located in the range of 0.05 MeV to 5 MeV for X- or gamma radiation and in the range of 0.05 to 10 MeV for beta radiation.

The radiation treatment of the composition of the present invention can be carried out in air, in a vacuum or in an appropriate gaseous atmosphere, in accordance with the methods known and practiced by those skilled in the art. The granulated particulate composition of the invention based on cross-linked polymers and/or co-polymers charged with powdered mineral material is particularly remarkable for the fact that it exhibits exceptional qualities in comparison to the qualities of the prior art compositions. Among the exceptional qualities, improved resistance to photodegradation, as well as a substantial increase in the number of cycles of water absorption and desorption and an increased capacity to absorb water for each cycle and to restore the absorbed water slowly to the media where said compositions are used are especially significant.

Having generally described this invention, a further understanding can be obtained by reference to certain specific examples which are provided herein for purposes of illustration only and are not intended to be limiting unless otherwise specified.

EXAMPLE 1

This example shows the preparation of a polymer composition containing powdered mineral material crosslinked by gamma radiation.

In a first run (Run 1) a mixture of acrylic acid (70% by weight) and acrylamide (30% by weight) diluted to 1 kg with water was placed into a suitable reactor while stirring. The aqueous solution obtained in this manner, kept at a temperature of below 40° C., was neutralized with a suitable agent (aqueous solution of sodium hydroxide) until a pH of 12.5-13 was obtained. Additional water was added such that the concentration of monomers in the neutralized aqueous solution containing them did not exceed 30% by weight of the total volume before being submitted to copolymerization.

Then a powdered mineral material, i.e., 0.464 kg of a clay of a low yield sold by the CECA Company bearing the designation FGN-FR, was finely dispersed in the aqueous solution of monomers while stirring the mixture for approximately 20 minutes and while bubbling nitrogen into the medium.

With the suspension prepared being maintained at room temperature, the following were introduced into the polymerization reactor in order to prepare a copolymerization catalyst in the form of an aqueous solution: (i) 0.78 gr of sodium persulfate, (ii) 0.39 gr of sodium metabisulfite, (iii) 0.078 gr of iron sulfate $.7H_2O$.

The polymerization was immediate and gave a solid, slightly elastic mass, which was easily granulated by passage through an industrial grinder producing granules of an average particle size between 2 and 3 millimeters. The granules obtained were not sticky, and therefore, incapable of reagglomeration.

By carrying out the same procedure, other polymer compositions were prepared (Runs 2 and 3) from the amounts of ingredients shown in Table I below. These runs are examples at the extreme limits of the present invention.

TABLE I

| RUN NOS. | 1 | 2 | 3 |
|---|---|---|---|
| Acrylic acid | 21.00 | 7.40 | 5.00 |
| Acrylamide | 9.00 | 17.30 | 20.00 |
| Clay | 14.00 | 16.50 | 16.50 |
| NaOH for neutralization expressed at 100% | 12.16 | 4.11 | 2.46 |
| Catalysts | 0.03 | 0.09 | 0.04 |
| Total water | 43.80 | 54.60 | 56.00 |

The three compositions shown in the table above were granulated, were deposited onto a support and were submitted to ionizing radiation from a source of $Co^{60}$ radioactive isotope. The average rate was 0.1 megarad per hour (one kilogray per hour: kgy).

The granules of Run 1 received a dose of 1 kgy and the granules of Runs 2 and 3 a dose of 4.5 kgy.

The granules irradiated in this manner were water-insoluble.

EXAMPLE 2

This example shows the preparation of a polymer composition containing powdered mineral material and cross-linked by a chemical agent.

A mixture of acrylic acid (70% by weight) and acrylamide (30% by weight) diluted to 1 kg with water was placed in a reactor while being stirred as in Example 1 (Run No. 4). (See Table II below) A chemical cross-linking agent composed of N,N'-methylene-bis-acrylamide was then added in an amount of 300 ppm.

The aqueous mixture obtained in this manner was treated with an aqueous solution of sodium hydroxide and brought to a pH of 12.5–13 while being kept at a temperature of less than 40° C.

The mixture neutralized in this manner was diluted with water such that the concentration of monomers did not exceed 30% by weight of the total mass of the mixture before copolymerization.

Then, the powdered mineral material, i.e., 0.464 kg of bentonite of the high yield montmorillonite type sold by the S.F.B.D. company under the name BENTONIL C, was added and finely dispersed in the aqueous solution of monomers. The suspension obtained was constantly stirred and nitrogen was bubbled into the solution.

While maintaining the suspension prepared in this manner at room temperature, the following were introduced into the polymerization reactor in order to prepare a copolymerization catalyst in the form of an aqueous solution: (i) 0.78 gr of sodium persulfate, (ii) 0.39 gr of sodium metabisulfite; and (iii) 0.078 gr of iron sulfate .7$H_2O$.

The rapid polymerization gave a solid mass which was easily transformed into granules by passage through an industrial grinder. These granules had no tendency to reagglomerate.

TABLE II

| RUN NO. 4 | |
|---|---|
| Acrylic acid | 21.00 |
| Acrylamide | 9.00 |
| Cross-linking agent | 0.03 |
| Montmorillonite | 14.00 |
| NaOH for neutralization expressed at 100% | 12.14 |
| Catalyst | 0.03 |
| Total water | 43.80 |

The granules chemically cross-linked in this manner were characterized, like the granules of Example 1, by an absence of water-solubility.

EXAMPLE 3

This example shows the preparation of a polymer composition containing radiochemically cross-linked and polymerized powdered mineral material.

A mixture of acrylic acid (70% by weight) and acrylamide (30% by weight) diluted to 1 kg with water were placed in a reactor while being stirred as in Example 1.

The aqueous mixture obtained in this manner was treated with an aqueous solution of sodium hydroxide and brought to a pH of 12.5–13 while being kept at a temperature of less than 40° C.

The mixture neutralized in this manner was diluted with water such that the concentration of monomers did not exceed 30% by weight of the total mass of the mixture before copolymerization.

Then, the powdered mineral material, i.e., 0.464 kg of high yield montmorillonite was added and finely dispersed in the aqueous solution of monomers. The suspension obtained was constantly stirred.

While maintaining the suspension prepared in this manner at room temperature and while stirring, the suspension was exposed to gamma radiation emitted by a $Co^{60}$ source. The dosage rate was 1 kgy per hour and the total dose given was 5 kgy. Stirring was stopped after 60 minutes of exposure.

The mass obtained by radiochemical cross-linking and polymerization was granulated by passage through an industrial grinder. The granules cross-linked in this manner were characterized, like the granules of Examples 1 and 2, by not being water soluble.

EXAMPLE 4

The object of this example is to illustrate the superior stability of the polymer composition of the present invention to the photodegrative effects of ultraviolet radiation in comparison to the compositions of the prior art.

The compositions of Runs 1 to 5 of the present invention together with the polymer composition of Run 6 which contains no mineral charge and is sold under the name AQUASORB A700, and a hydrophilic polymer composition, coated by mixing with a protective layer of powdered mineral material such as described in French Pat. No. 2,173,934 (Run 7), with the latter two tests comprising the prior art, were submitted to ultraviolet radiation. Each polymer composition was placed in a chamber containing four lamps (mercury vapor), each with 15 watts of power, whose radiation was centered on 253.7 nanometers. The exposure time was at most 60 hours for each test, representing the same dose of radiation.

The results obtained are shown in Table III below, expressing the percentage of loss of material (by weight) as a function of exposure time.

TABLE III

| RUNS | % BY WEIGHT OF LOSS OF MATERIAL AFTER TESTS AN EXPOSURE TIME (IN HOURS) OF: | | | | |
|---|---|---|---|---|---|
| | 4 h | 6.5 h | 12 h | 35 h | 60 h |
| 1 | 13 | 35 | 47 | 80 | 96 |
| 2 | 15 | 31 | 40 | 50 | 64 |
| 3 | 17 | 35 | 50 | 66 | 80 |
| 4 | 10 | 28 | 35 | 41 | 51 |
| 5 | 16 | 36 | 50 | 61 | 88 |
| 6 | 80 | 100 | | | |
| 7 | 13 | 35 | 48 | 76 | 92 |

EXAMPLE 5

This example illustrates by comparison with the polymer compositions of the prior art, the capability of absorbing and desorbing water and excellent resistance to aging of the compositions of the present invention when they are subjected to repeated cycles of water absorption and desorption.

Each polymer composition submitted to this test was first dried at a temperature of 60° C. for a period of 48 hours and weighed. Each dried composition was then immersed in distilled water for 10 hours, weighed so as to determine the quantity of water absorbed, and finally dried under the same conditions as above and weighed. In this manner, the rate of absorption (or of swelling) and of desorption of each polymer composition could be determined by using the following ratio:

Rate of absorption =

$$\frac{\left(\begin{array}{c}\text{Weight of the composi-}\\\text{tion after absorption}\end{array}\right) - \left(\begin{array}{c}\text{Dry weight of the}\\\text{composition before}\\\text{absorption}\end{array}\right)}{\text{Dry weight of the composition before absorption}}$$

Each polymer composition, whether of the invention or of the prior art, was subjected to five cycles of water absorption and desorption.

Between each cycle, it was possible to determine the rate of loss of material which is a measure of the stress on the tested polymer or a weakening of the characteristics of the polymer caused by premature aging.

The rate of loss of material can be determined by the following ratio:

Material loss in % =

$$\frac{\left(\begin{array}{c}\text{Weight of the composi-}\\\text{tion before absorption}\end{array}\right) - \left(\begin{array}{c}\text{Dry weight of the}\\\text{composition after}\\\text{absorption}\end{array}\right)}{\text{Dry weight of the composition before absorption}}$$

The polymer compositions corresponding to Runs 1 to 4 and 7 were submitted to the water absorption and desorption cycle test, for which all the results relative to the rate of absorption and to the rate of loss of material are given in Table IV below.

TABLE IV

| TESTS | CYCLE NO. | 1 | 2 | 3 | 4 | 7 |
|---|---|---|---|---|---|---|
| ABSORPTION BY WEIGHT | 1 | 300 | 219 | 242 | 150 | 129 |
| LOSS OF MATERIAL IN % BY WEIGHT | | 0 | 0 | 0 | 0 | 0 |
| ABSORPTION BY WEIGHT | 2 | 303 | 219 | 220 | 152 | 152 |
| LOSS OF MATERIAL IN % BY WEIGHT | | 9.6 | 1.6 | 1.1 | 1.6 | 36.8 |
| ABSORPTION BY WEIGHT | 3 | 385 | 229 | 246 | 157 | 163 |
| LOSS OF MATERIAL IN % BY WEIGHT | | 15.1 | 3 | 4.2 | 3.0 | 37.8 |
| ABSORPTION BY WEIGHT | 4 | 374 | 224 | 253 | 150 | 159 |
| LOSS OF MATERIAL IN % BY WEIGHT | | 19 | 4.4 | 5.7 | 4.0 | 41.6 |
| ABSORPTION BY WEIGHT | 5 | 370 | 219 | 252 | 143 | 149 |
| LOSS OF MATERIAL IN % BY WEIGHT | | 22.3 | 5.3 | 8.3 | 5.1 | 44.5 |

As is shown in Table IV, the compositions of the present invention have rates of water absorption (or swelling) which on the average are very much higher and, in the least favorable case, are equivalent to those of the prior art.

In addition, the compositions of the present invention are infinitely less sensitive to repeated absorption-desorption cycles, with this lower sensitivity being demonstrated by less loss of material (expressed in accumulated weight percent) after five cycles which is infinitely smaller (between 5.1% and 22.3%) than that of the prior art composition (44.5%).

Obviously, numerous modifications and variations of the present invention are possible in light of the above teachings. It is therefore to be understood that within the scope of the appended claims, the invention may be practiced otherwise than as specifically described herein.

We claim:

1. A granular polymer composition having water absorption and desorption capability, comprising: a water-insoluble but swellable cross-linked polymer material formed of at least one polymer and/or copolymer prepared from at least one unsaturated ethylene monomer having at least one carboxylic, amide, sulfuric, sulfonic, phosphoric, phosphonic, or hydroxyl functional group and at least one powdered mineral charge well dispersed in and bonded to said polymer as a result of its introduction into the mixture of monomers of the same type or of a different type before their polymerization into said polymer or copolymer.

2. The granular polymer composition of claim 1, wherein the polymer and/or copolymer is of the formula:

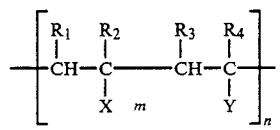

in which X and Y are different or identical and each is a functional group selected from the group consisting of —COOH, —CONH$_2$, —O—SO$_3$H, —SO$_3$H, —O—PO$_3$H$_2$, —PO$_3$H$_2$, and —OH, m and n, expressed in percent by weight, are within ranges $0 \leq m \leq 100$ and $100 \leq n \leq 0$, the radicals R$_1$ and R$_3$ are each selected from the group consisting of —H, —OH, —COOH and the substituted or unsubstituted alkyls, and radicals R$_2$ and R$_4$ are each selected from the group consisting of —H, —COOH, —CO—NH$_2$, —O—SO$_3$H, —SO$_3$H, —O—PO$_3$H$_2$, —PO$_3$H$_2$, —OH and the substituted or unsubstituted alkyls.

3. The granular polymer composition of claim 2, wherein when the radicals R$_1$, R$_2$, R$_3$ and R$_4$ are each substituted or unsubstituted C$_{1-4}$ alkyl.

4. The granular polymer composition of claims 1, 2 or 3, wherein the polymer and/or copolymer is prepared from at least one of the monomers selected from the group consisting of acrylic, methacrylic, itaconic, crotonic, isocrotonic, aconitic, fumaric, mesaconic, sinapic, undecylenic, angelic, hydroxyacrylic and maleic acids or anhydrides, acrylamide, methacrylamide, acrylamidopropane sulfonic acid, vinyl ether, vinyl sulfonic acid, vinyl alcohol, styrenesulfonic acid, alkyl acrylates and methacrylates, hydroxyalkyl acrylates and methacrylates, phosphoric acrylate and hydroxylmethacrylate esters and sulfuric acrylate esters.

5. The granular polymer composition of claim 1, wherein the acid functional group of the polymer and/or copolymer is in salt form.

6. The granular polymer composition of claim 1, wherein the mineral charge intimately dispersed within said polymer and/or copolymer is a clay material which is capable of forming a plastic suspension which is stable on contact with water and which is a kaolinite, a mica, an illite, a glauconite, a montmorillonite, a chlorite, a vermiculite, an interstratified clay whose unitary structure is a combination of the preceding groups, or a fibrous clay.

7. The granular polymer composition of claim 1, wherein the mineral charge can contain other mineral materials selected from the group consisting of quartz, calcite, dolomite, gypsum, and limonite (FeO(OH)$_n$·H$_2$O).

8. The granular polymer composition of claim 1, wherein the mineral charge which is intimately dispersed within the polymer and/or copolymer is present in the composition in the weight ratio of mineral charge to monomer mixture ranging from 10/90 to 90/10.

9. The granular polymer composition of claim 8, wherein said ratio ranges from 50/50 to 20/80.

10. The granular polymer composition of claim 1, wherein said composition further contains at least one agent which promotes chemical cross-linking, an ultraviolet radiation stabilizing agent, a dispersing agent, a coloring agent, a pigment, a biocidal agent, and a soil conditioning agent.

11. A method for preparing a granular polymer composition having water absorption and desorption capability, comprising:
 (a) preparing an aqueous phase mixture by dispersing a finely divided powdered mineral charge in an aqueous medium containing at least one unsaturated ethylene monomer having at least one functional group selected from the group consisting of —COOH, —CONH$_2$, —OSO$_3$H, —SO$_3$H, —O-PO$_3$H$_2$, and —OH;
 (b) polymerizing said at least one unsaturated ethylene monomer in the presence of an initiator and a regulator added to the aqueous medium or by exposure of the aqueous medium to ionizing radiation; and
 (c) granulating the polymer product obtained in step (b).

12. The method of claim 11, wherein the weight ratio of the unsaturated ethylene monomer to aqueous phase in step (a) ranges from 80/20 to 20/80.

13. The method of claim 12, wherein said ratio ranges from 60/40 to 40/60.

14. The method of claim 11, wherein polymerization step (b) is a chemical technique employing a peroxide radical initiator or a per salt and a regulator which is a hydroxyamine or a mercaptan in an aqueous medium or an aqueous alcohol medium.

15. A method for preparing a granular polymer composition having water absorption and desorption capability, comprising:
 (a) preparing an aqueous phase mixture by dispersing a finely divided powdered mineral charge in an aqueous medium containing at least one unsaturated ethylene monomer having at least one functional group selected from the group consisting of —COOH, —CONH$_2$, —OSO$_3$H, —SO$_3$H, —O-PO$_3$H$_2$, —PO$_3$H$_2$ and —OH;
 (b) introducing a chemical cross-linking agent or other agents, or both, into the mixture obtained in step (a);
 (c) polymerizing said at least one unsaturated ethylene monomer in the presence of an initiator and a regulator added to the aqueous medium or by exposure of the aqueous medium to ionizing radiation; and
 (d) granulating the cross-linked polymer product obtained in step (c).

16. The method of claim 15, wherein, in the event insufficient cross-linking agent has been added to the aqueous medium to effect complete cross-linking of the polymer the polymer product, before or after granulation, is subjected to ionizing radiation in order to complete cross-linking of the polymer product.

17. The method of claim 15, wherein polymerization step (c) is a chemical technique employing a peroxide radical initiator or a per salt and a regulator which is a hydroxyamine or a mercaptan in an aqueous medium of an aqueous alcohol medium.

18. The method of claim 15, wherein polymerization step (c) is a radiochemical polymerization technique using a radioactive isotope as the source of ionizing radiation.

19. The method of claim 15, wherein said chemical cross-linking agent is a material selected from the group consisting of methylene-bis-acrylamide, tetraallyl oxyethane and methylol acrylamide.

20. The method of claim 15, wherein the weight ratio of the unsaturated ethylene monomer to aqueous phase in step (a) ranges from 80/20 to 20/80.

21. The method of claim 20, wherein said ratio ranges from 60/40 to 40/60.

22. The method of claim 15, wherein the ionizing radiation treatment is conducted by means of a source selected from the group consisting of radioactive isotopes emitting gamma radiation, X-ray generators and electron accelerators generating beta radiation.

23. The method of claim 22, wherein the ionizing radiation desirably has an energy level within the range 0.05 MeV to 5 MeV for the X- or gamma rays and within the range 0.05 to 10 MeV for the beta rays.

24. The method of claim 15, wherein the radiation treatment is carried out in air, in a vacuum or in an appropriate gaseous atmosphere.

* * * * *